United States Patent

[11] 3,581,837

[72] Inventor John H. Bauschard
 316 E. 28th St., Erie, Pa. 16504
[21] Appl No. 818,344
[22] Filed Apr. 22, 1969
[45] Patented June 1, 1971

[54] BATTERY CLAMPING LUGS
 1 Claim, 4 Drawing Figs.
[52] U.S. Cl. ................................................ 180/68.5
[51] Int. Cl. ............................................. B62d 25/00
[50] Field of Search ...................................... 180/68.5;
 136/171, 166, 181

[56] References Cited
 UNITED STATES PATENTS

| | | | |
|---|---|---|---|
| 2,827,973 | 3/1958 | Coleman | 180/68.5 |
| 2,956,101 | 10/1960 | Buhl, Jr. | 180/68.5UX |
| 3,167,458 | 1/1965 | Brazell | 180/68.5X |
| 3,248,268 | 4/1966 | Kohler | 180/68.5X |
| 3,379,400 | 4/1968 | Bauschard | 180/68.5X |

FOREIGN PATENTS

| | | | |
|---|---|---|---|
| 556,687 | 4/1923 | France | 180/68.5 |
| 401,359 | 11/1933 | Great Britain | 136/171 |
| 521,403 | 5/1940 | Great Britain | 180/68.5 |

*Primary Examiner*—Kenneth H. Betts
*Assistant Examiner*—Milton L. Smith
*Attorney*—Charles L. Lovercheck ABSTRACT: A battery retention system which is intended to support a conventional type of automobile battery in its rack in an automobile or truck. The retention system is made up of spaced lugs integrally attached to two opposite sides or ends by the battery case. A holddown rod is attached to each of two opposite sides of the battery rack. The lugs are spaced apart just enough to freely receive the bolts between them. Each lug has an indentation, and a rubber washer is received on each bolt. A metal washer is supported on the top of the rubber washer and the rubber washer is deformed into the notch in the lugs so that the holddown rod will not slip relative to the case. The insulation characteristics of the rubber prevents leakage of electrical current from the battery to the battery case.

PATENTED JUN 1 1971 3,581,837

Inventor
JOHN H. BAUSCHARD
By Charles L. Loverduk
Attorney

BATTERY CLAMPING LUGS

STATEMENT OF INVENTION

This invention relates to clamping devices and, more particularly, to devices for holding batteries in battery cases in automobiles.

OBJECTS OF THE INVENTION

It is an object of the invention to provide an improved battery retention system for motor vehicles.

Another object of the invention is to provide an improved battery retention system for motor vehicles by the use of added units integrally attached to the battery box walls, a rubber and a metal washer clamping the lugs.

Another object of the invention is to provide an improved battery retention system utilizing integral lugs on the battery box walls, the upper surfaces being indented and adapted to have a rubber washer rest on the indented surface thereby holding the battery in place.

DETAILED DESCRIPTION OF DRAWINGS

Figure 4:
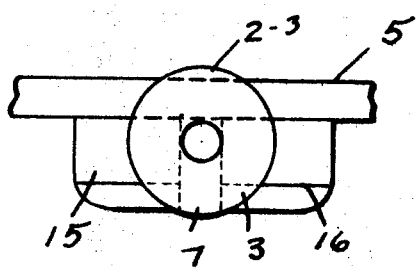
FIG. 4 is a top view of the device according to the invention, showing the rubber washer in place but the nut and rod omitted.
Figure 1:
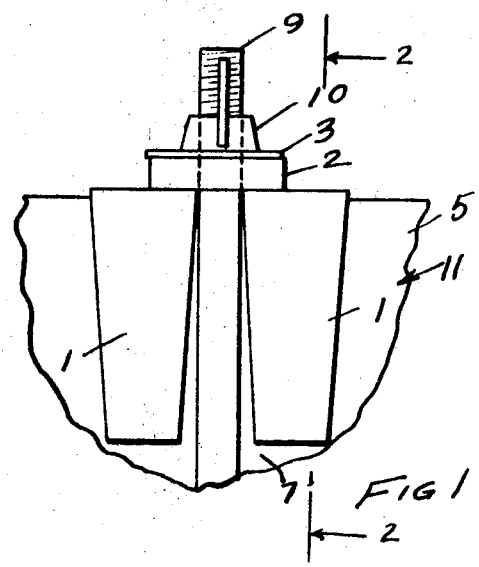
FIG. 1 is a partial face view of an end or a side of a part of a battery supported on a battery case according to the invention.
Figure 2:
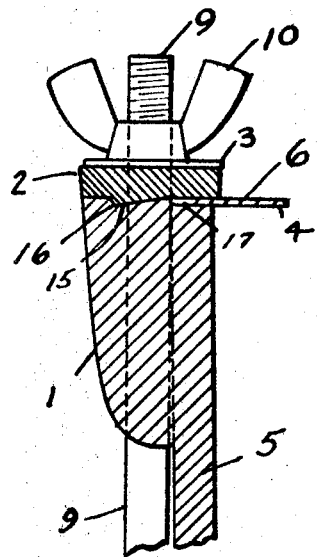
FIG. 2 is a cross-sectional view taken on line 2–2 of FIG. 1 with the rubber washer and nut in cross section.
Figure 3:
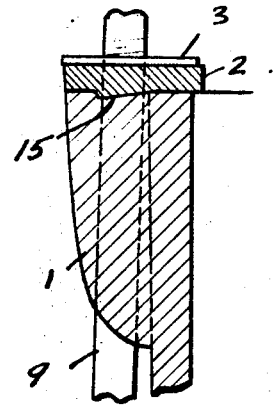
FIG. 3 is a view similar to FIG. 2 showing a battery with a mastic filled top.

Now with more particular reference to the drawings, one end of the battery 11 is shown having wall 5. The other end may, of course, be symmetrical to the end shown. The battery is of a type familiar to those skilled in the art. The battery 11 is supported on a battery rack of the conventional type. The battery rack has means which receive the holddown rods 9 such as, for example, holes, notches or the like, which extend upwardly and are disposed between the spaced lugs 1. Spaced lugs 1 are formed or cast integral with the end or sidewalls of the battery. The lugs are located to suit the position of the holddown rods. The rods 9 have the wingnut 10 suitably supported on their upper end and the wingnut rests on the metal washers 3 which in turn rest on the rubber washers 2. The rubber washers 2 are sufficiently flexible so that they will be deformed to conform to the indent 15 in the upper surface of the lugs 1. Indent 15 has a downwardly and outwardly sloping surface terminating in the shoulder 16 so that the washers, in effect, form an interlocked joint in the indent when wingnuts are tightened.

A sheet of plastic material 6 may overlie the top of the battery case and rest on top of the battery and in the recess 17 at each end or side of the battery to protect the top of the battery. The purpose of the recess 17 is to compensate for the thickness of sheet 6.

It will be noted that there are spaced lugs on each side or each end of the battery case that are engaged by the battery case by which the battery is clamped to the battery rack.

Washer 2 has sufficient electrical insulation properties to prevent leakage of electrical current from the battery to the bolts 9 and rack 4.

This system is a radical departure from any former or current systems in use. It retains, however, the holddown rod which engages the battery box in a positive and firm manner. When the washers and nut are applied and tightened, the rubber washer will be sufficiently depressed over the flat surfaces of the lugs and battery wall to allow the undepressed rubber to occupy the trough space. This automatically provides a safety lock-in against any tendency of the rod to move out of the slot. Then, too, the insulation value of rubber assures no leakage of voltage.

The embodiments of the invention in which I claim an exclusive property or privilege are defined as follows:

1. A battery holddown device comprising a battery,
    said battery having a case supported on a battery rack,
    said battery case having laterally spaced lugs at each end or each side and said spaced lugs being integrally attached to said case,
    a washer having substantially the same properties of resiliency as rubber overlying each pair of said lugs,
    a bolt engaging each end or each side of said battery rack and extending upward between said lugs and through said washers and a nut on said bolt clamping said washers and said battery in place,
    said lugs having an indented surface on their upper side,
    said indent slopes outwardly and downwardly and terminates in a generally vertical inwardly facing shoulder,
    said rubber washer is compressed by said nut and thereby deformed to conform to the shape of said indent, thus locking said rod in firm position,
    said battery case has a recess adjacent each pair of said lugs,
    a sheet of material overlying said battery and terminating in said recess,
    said rubber washer overlying said sheet and holding said sheet in place.